United States Patent
Buttermore

(10) Patent No.: US 11,845,553 B1
(45) Date of Patent: Dec. 19, 2023

(54) APPARATUS AND METHOD FOR ORDINANCE MOUNTING SYSTEM

(71) Applicant: Neil Buttermore, Gunnison, CO (US)

(72) Inventor: Neil Buttermore, Gunnison, CO (US)

(73) Assignee: Neil Buttermore, Newport Beach, CA (US)

( * ) Notice: Subject to any disclaimer, the term of this patent is extended or adjusted under 35 U.S.C. 154(b) by 0 days.

(21) Appl. No.: 17/824,592

(22) Filed: May 25, 2022

(51) Int. Cl.
| | | |
|---|---|---|
| *B64D 1/04* | (2006.01) | |
| *B64D 5/00* | (2006.01) | |
| *B64C 39/02* | (2023.01) | |
| *B64U 101/05* | (2023.01) | |

(52) U.S. Cl.
CPC .............. *B64D 1/04* (2013.01); *B64C 39/024* (2013.01); *B64D 5/00* (2013.01); *B64U 2101/05* (2023.01)

(58) Field of Classification Search
CPC ............ B64U 2101/15; B64U 2101/60; B64U 2101/64; B64D 1/04; B64D 1/08
See application file for complete search history.

(56) References Cited

U.S. PATENT DOCUMENTS

| | | | |
|---|---|---|---|
| 4,616,215 A | 10/1986 | Maddalena | |
| 4,925,225 A * | 5/1990 | Dost | B66C 1/0293 |
| | | | 294/186 |
| 5,244,242 A | 9/1993 | Goedecke | |
| 5,795,001 A * | 8/1998 | Burke | B65G 49/061 |
| | | | 294/185 |
| 6,817,639 B2 * | 11/2004 | Schmalz | B65G 47/91 |
| | | | 294/185 |
| 7,677,622 B2 | 3/2010 | Dunkmann | |
| 9,091,612 B2 | 7/2015 | Lehmann | |
| 9,527,605 B1 | 12/2016 | Gentry | |
| 9,573,684 B2 | 2/2017 | Kimchi | |
| 9,581,148 B1 * | 2/2017 | Solomon | B66C 1/0287 |
| 9,821,721 B2 | 11/2017 | Casagrande | |
| 10,267,453 B2 | 4/2019 | Casagrande | |
| 10,483,142 B1 | 11/2019 | Tan | |
| 10,514,024 B1 * | 12/2019 | Shoemaker, Jr. | F04B 35/04 |

(Continued)

FOREIGN PATENT DOCUMENTS

| | | |
|---|---|---|
| CN | 104323657 | 2/2015 |
| CN | 104622187 | 5/2015 |

(Continued)

OTHER PUBLICATIONS

"Vacuum Controllers, Gauges, and Systems" by Cole-Parmer Instrument Company, LLC, Web page <https://www.coleparmer.com/c/vacuum-controllers-gauges-and-systems>, 4 pages, Mar. 8, 2022.

(Continued)

*Primary Examiner* — Richard G Davis
(74) *Attorney, Agent, or Firm* — Raymond W. Armentrout; Bamert Regan PLLC

(57) ABSTRACT

Embodiments of a payload attachment system secure a payload to a wing or fuselage of the drone 102 (or another type of aircraft) using one or more vacuum mounting modules, wherein each vacuum mounting module comprises at least one vacuum pump controllably coupled to a microcontroller, a vacuum cup fluidly coupled to the at least one vacuum pump, and a transceiver that receives an instruction corresponding to one of a vacuum cup actuation signal or a vacuum cup release signal.

13 Claims, 7 Drawing Sheets

(56) References Cited

U.S. PATENT DOCUMENTS

| | | | |
|---|---|---|---|
| 10,723,276 | B2 | 7/2020 | Casagrande |
| 10,737,632 | B2 | 8/2020 | Casagrande |
| 2005/0119789 | A1 | 6/2005 | Seeman |
| 2009/0242719 | A1 | 10/2009 | Carnevali |
| 2013/0299667 | A1 | 11/2013 | Casagrande |
| 2015/0375401 | A1 | 12/2015 | Dunkmann |
| 2016/0023762 | A1 | 1/2016 | Wang |
| 2017/0197719 | A1 | 7/2017 | Kwon |
| 2019/0077027 | A1* | 3/2019 | Tanaka .............. B64D 1/22 |
| 2019/0375604 | A1* | 12/2019 | Kuo .............. B25B 11/007 |
| 2020/0198546 | A1 | 6/2020 | Casagrande |
| 2020/0247539 | A1* | 8/2020 | Shoemaker, Jr. ...... B64U 10/13 |
| 2020/0331406 | A1 | 10/2020 | Casagrande |

FOREIGN PATENT DOCUMENTS

| | | |
|---|---|---|
| CN | 105757110 | 7/2016 |
| CN | 109552194 | 4/2019 |
| CN | 114379465 | 4/2022 |
| KR | 20080054468 | 6/2008 |
| WO | 2014043261 | 3/2014 |
| WO | 2018227203 | 12/2018 |

OTHER PUBLICATIONS

"Freedom IQ Vacuum System" Information for Use pamphlet, Rev A, 2019, 20 pages, IFU-03-004, Freedom Innovations, LLC, Irving, CA.

"Precision Vacuum Monitor" by Lab Society, Web page <https://labsociety.com/lab-equipment/precision-vacuum-monitor/>, 8 pages, Mar. 8, 2022.

"Vacuum Pads for Uneven Surfaces" by McMaster-Carr, Web page <https://www.mcmaster.com/vacuum-cup-mounts/vacuum-pads-for-uneven-surfaces/>, 2 pages, Apr. 9, 2021.

"Static-Control Vacuum Pads for Uneven Surfaces" by McMaster-Carr, Web page <https://www.mcmaster.com/vacuum-cup-mounts/static-control-vacuum-pads-for-uneven-surfaces/>, 1 page, Apr. 9, 2021.

"Freedom Innovations Collection" by PROTEORUSA, Web page <https://www.proteorusa.com/freedominnovationscollection>, 3 pages, Mar. 8, 2022.

* cited by examiner

APPARATUS AND METHOD FOR ORDINANCE MOUNTING SYSTEM

BACKGROUND OF THE INVENTION

In various situations, it is desirable to releasably secure ordinance, interchangeably referred to herein as a payload, to an aircraft, unmanned drone, or the like. Typically, such ordinance are suspended from the fuselage and/or wings of the aircraft or the frame of a drone. Payloads are secured at a hard point that is structurally capable of supporting a predefined payload that weighs less than some predefined maximum weight. The payload is mateably secured to the aircraft or drone using a connector on the distal end of a pylon. The payload may be secured directly to the pylon. Or, if multiple payloads are secured to a pylon, the payloads may be secured to a rack that is secured to the distal end of the pylon.

FIG. 1 is a front view diagram of an example legacy military purposed aerial drone 102. Here, the non-limiting example payload 104 is the AGM-114 (air to ground missile) Hellfire. With a weight of just over one hundred pounds, the AGM-114 Hellfire may be a suitable payload 104 for a drone 102 because of its relatively small size and light weight. Another non-limiting example of a payload 104 is a smaller drone that might be used for surveillance and/or for delivering ordinance. Such payloads 104 are suspended from the wings or fuselage of the drone 102 using a pylon 106.

The illustrated example drone 102 is propelled forward by an engine and propellor 106. Some military purposed drones are jet propelled. One or more VTOL (vertical takeoff and landing) motors and propellors may be used for field launching and landing of the drone 102. Alternatively, some legacy drones have landing gear for takeoff and landing on a flat surface, such as an airfield, road, aircraft carrier, or the like.

One problem encountered in the arts is that the radar reflections from a pylon 106 may be undesirable, particularly if the drone is stealthy. That is, a stealthy drone is designed with an exterior that minimally reflects incident radar energy. However, the pylon 106 may itself be a source of undesirable radar reflections. Accordingly, in the arts of stealth technologies, there is a need in the arts for improved methods, apparatus, and systems for reducing radar reflections from pylons 106 used to secure ordinance to a drone.

Further, ordinance is typically secured to the pylon 106 while the drone 102 at a base station, such as an airfield, aircraft carrier, etc. In practice, travelling from the base station to the battlefield, and then returning back to the base station after the ordinance has been released from the drone 102, takes some amount of time (based on velocity of the drone 102 and distance between the base station and the battlefield site). Accordingly, in the arts of using a military purposed drone 102 or other aircraft, there is a need in the arts for improved methods, apparatus, and systems for quickly rearming military purposed drone 102 or other aircraft without the need to return to the base station.

Also, attaching ordinance to the pylons 106 of a drone or other aircraft is a time consuming effort for the ground crew. Accordingly, in the arts of releasably securing payloads 104 to a drone 102 or other aircraft, there is a need in the arts for improved methods, apparatus, and systems for quickly securing the payload 104 to the military purposed drone 102 or other aircraft.

Additionally, the attaching means that are used to secure the payload 104 to a pylon 106 (or rack) may be limiting in that both the pylon 106 (or rack) and the payload 104 must have corresponding connectors. If the connectors on the pylon 106 do not match the connector on the payload 104, the payload 104 cannot be secured to the pylon 106. Accordingly, in the arts of releasably securing payloads 104 to a drone 102 or other aircraft, there is a need in the arts for improved methods, apparatus, and systems for securing the payloads 104 when the connectors on the pylon 106 and payload 104 do not correspond, or to secure the payload 104 with no connectors at all.

SUMMARY OF THE INVENTION

Embodiments of a payload attachment system secure a payload to a wing or fuselage of the drone 102 (or another type of aircraft) using one or more vacuum mounting modules, wherein each vacuum mounting module comprises at least one vacuum pump controllably coupled to a microcontroller, a vacuum cup fluidly coupled to the at least one vacuum pump, and a transceiver that receives an instruction corresponding to one of a vacuum cup actuation signal or a vacuum cup release signal.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
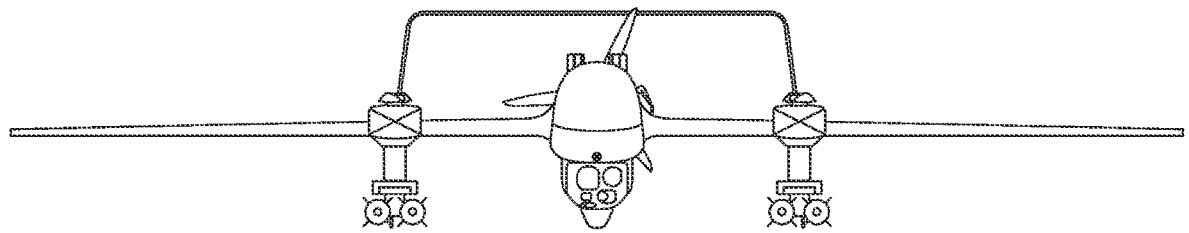
FIG. 1 is a front view of a legacy military purposed aerial drone with ordinance secured to a legacy pylon.
Figure 2:
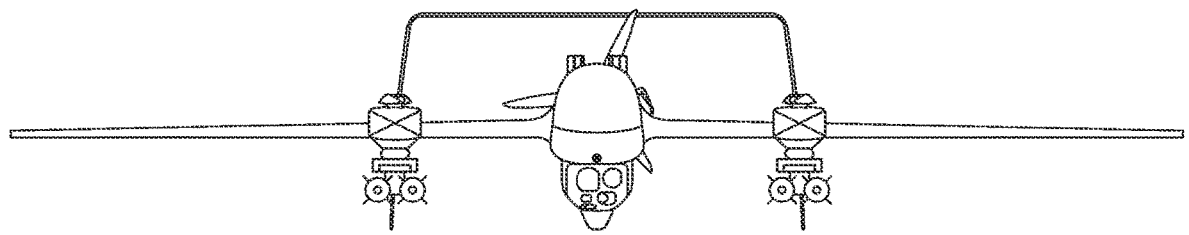
FIG. 2 is a front view of the legacy military purposed aerial drone with missiles secured to the drone using an ordinance attachment system.
Figure 3:
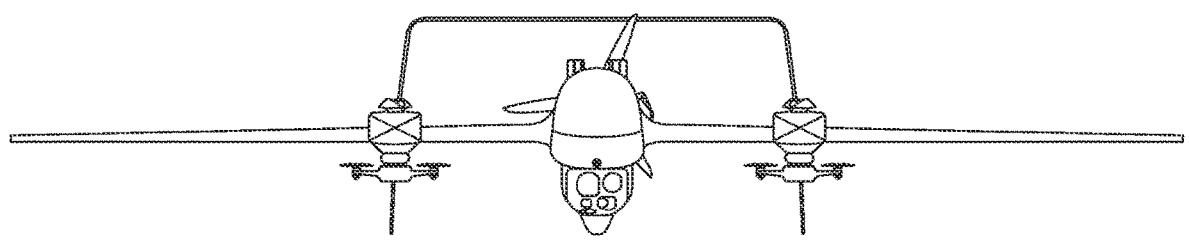
FIG. 3 is a front view of the legacy military purposed aerial drone with a plurality of small drones secured to the drone using an ordinance attachment system.

FIG. 2 is a front view of the legacy military purposed aerial drone 102 with a plurality of missiles 104a secured to the drone using an ordinance attachment system 200. FIG. 3 is a front view of the legacy aerial drone 102 with a plurality of small drones 104b secured to the drone using an ordinance attachment system 200. As defined herein, the term payload 104 refers to any payload of interest, such as the non-limiting example missiles 104a, the small drones 104b, and/or other ordinance. The payload 104 is releasably secured to the drone 102 (or another type of aircraft) using one or more vacuum mounting modules 202.

Figure 4:
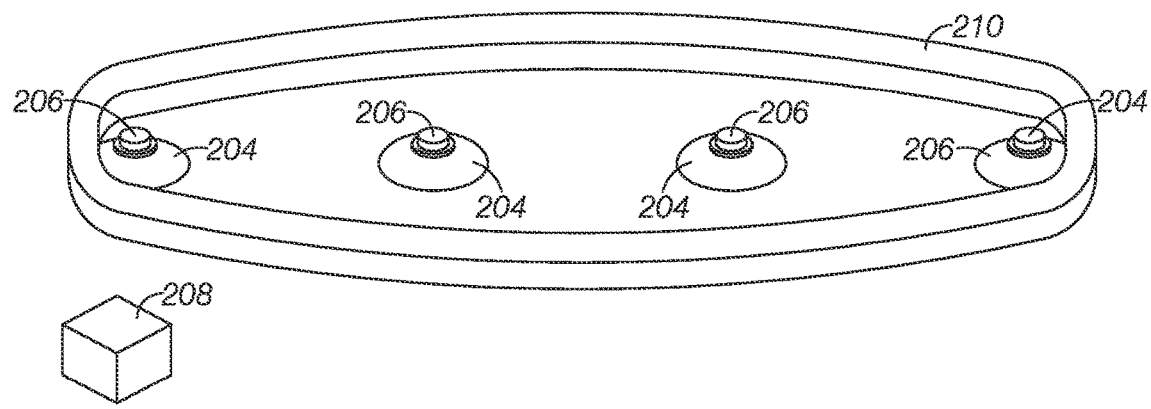
FIG. 4 is a side cut away view of the vacuum mounting module with a non-limiting example cover member.

FIG. 4 is a diagram of four vacuum mounting modules 202. Each vacuum mounting module 202 includes a vacuum cup 204 and a vacuum control unit 206. The vacuum cup 204 is disposed on an exterior of the vacuum mounting module 202. The outside surface of the vacuum control unit 206 (opposing the vacuum cup 204) is configured to be permanently secured to, or semipermanently secured to, a surface of a first object as described hereinbelow.

When a vacuum within the interior of the vacuum cup 204 is created by the vacuum control unit 206, the vacuum mounting module 202 becomes releasably secured to the surface of a second object. In practice, in response to receiving a vacuum cup actuation signal from a vacuum control device 208, the vacuum control unit 206 operates one or more internal vacuum pumps to create a vacuum having at least a predefined vacuum level (a negative atmospheric pressure) within the interior region of the vacuum cup 204.

The vacuum cup actuation signal may be generated by a variety of vacuum control devices 208 depending upon the particular embodiment of the payload attachment system 100. For example, a payload installer may provide input to the vacuum control device 208 to establish a vacuum. Here, the payload installer would pair their vacuum control device 208 with a plurality of vacuum control units 206 that are to be used for a securing a particular payload 104.

For example, the payload 104 may be releasably secured the wing or fuselage of a drone 102 (or another type of aircraft). When the payload 104 is held in place by one or more payload installers, the vacuum pumps are actuated. The vacuum in each vacuum cup 204 then secures the payload 104 to the drone 102 (or another type of aircraft). During flight to a battlefield, the secured payload 104 remains in place. In response to a vacuum cup release signal, the vacuum in the vacuum cups 204 is released. The payload 104 then falls away from the drone 102 (or another type of aircraft).

In the various embodiments, pylons 106 are not needed to releasably secure payloads to the drone 102 (or another type of aircraft). An unexpected benefit provided by embodiments of the payload attachment system 100 is that the undesirable radar reflections from the pylons 106 are eliminated. Another unexpected benefit is that eliminating the weight of the pylons 106 may increase the total payload capacity of the drone 102 (or another type of aircraft). Also, connectors on the payload 104 and the pylon 106 are no longer required. Accordingly, the problem of unmatched connectors is removed.

Yet another advantage provided by embodiments of the payload attachment system 100 is that the time required to secure a payload 104 to a drone 102 (or another type of aircraft) is significantly reduced. And, the payload installers do not have to use specialty designed tools. Rather, the payload installers simply hold the payload 104 in place until the vacuum in the vacuum cups 204 are established.

When the drone 102 (or another type of aircraft) has VTOL capabilities, the drone 102 (or another type of aircraft) can make multiple deliveries while in the field. For example, if a VTOL drone 102 is being used to deliver a plurality of AGM-114 Hellfire missiles 104a (which only weigh 104 lbs. each) in a battlefield, the VTOL drone 102 may deliver a first plurality of missiles 104a to targets of interest. Then, the VTOL drone 102 may return back to a safe location behind friendly lines (rather than the remotely located base station). The VTOL drone 102 may then be quickly reprovisioned with a second plurality of missiles 104a, and then return to the battlefield.

The disclosed systems and methods for securing a payload 102 using the payload attachment system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for releasably securing a payload to a secured-to object using the payload attachment system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Secured to" means directly connected without intervening components.

"Communicatively coupled" means that an electronic device is communicatively connected to another electronic device, either wirelessly or with a wire based connector, whether directly or indirectly through a communication network. "Controllably coupled" means that an electronic device controls operation of another electronic device.

Returning to FIG. 4, in preferred embodiments the vacuum control device 208 may reside within the drone 102. The drone operator and/or the payload installer can communicatively couple their electronic devices to the vacuum control device 208 to cause generation of the actuation signal or release signal.

To pair a vacuum control unit 206 with a vacuum control device 208, the payload installer can simply turn on the plurality of vacuum mounting modules 202 that are to be used to secure a payload 104. Other vacuum mounting modules 202 that remain off will not respond to the vacuum control device 208. Other embodiments may use any suitable pairing method.

Once the vacuum control device 208 is paired with the vacuum mounting modules 202 and the payload is secured, drone 102 can travel to the battlefield. Then, the vacuum control device 208 can receive release instructions from the drone operator who is operating an electronic device that controls the drone 102 and the vacuum control device 208.

Since each vacuum mounting module 202 independently maintains a target vacuum level within its respective vacuum cup 204, the payload 102 may be secured for any period of time of interest. That is, the vacuum control unit 206 may actuate an internal vacuum pump as needed to maintain the predefined vacuum pressure between the surface and the vacuum cup 204. When the vacuum is released by the vacuum control unit 206, the vacuum cup 204 releases from the object.

An optional outer seal 210 may be used to form a seal between the surfaces of a wing or fuselage of the drone 102 (or other aircraft) and a payload 104. The outer seal 210 is a suitable semi-rigid or flexible compressible material that generally conforms to the shape and size of the outer perimeter of the one or more vacuum mounting modules 202. In a preferred embodiment, the outer seal 210 is made of neoprene, rubber, rubberized foam, or the like of a suitable thickness (height) that is sufficient to create a cavity between the surfaces of the two objects being secured together.

In the various embodiments employing the optional outer seal 210, in response to actuation of the payload attachment system 100, air is drawn out from the plurality of vacuum mounting modules 202. The flexible vacuum cups 204 partially collapse, decreasing their height as the vacuum within the vacuum cups 204 is created. The downward collapse of the vacuum cups 204 pulls the surfaces of a wing or fuselage of the drone 102 (or other aircraft) and the payload 104 together. Accordingly, the outer seal 210 is compressed to form a frictional seal between the surfaces of the wing or fuselage of the drone 102 (or other aircraft) and the payload 104. Since the vacuum cups 204 are within the cavity formed by the compressed outer seal 210, the vacuum cups 204 are protected from weather and/or forces created by moving air. That is, since the outer seal 210 is made of a flexible and air tight material such as neoprene or the like, the outer seal 210 serves to diffuse weather and moving air away from the vacuum cups 204 to avoid disturbance to the vacuum cups 204. By protecting the seal of the vacuum cups 204, power requirements on the vacuum pumps may be decreased. Further, reliability may be increased to the leading edge vacuum cups 204 that may otherwise experience the greatest "lift" during movement of the drone 102.

In some embodiments, the outer seal 210 is affixed to the payload 102 or the surface the wing or fuselage of the drone 102 (or another type of aircraft) using a suitable means. The payload installer simply has to hold the payload 104 in place, preferably pushing the payload 104 gently onto the outer seal 210. When the vacuum is established, the payload installer may release the payload 104 since the payload 104 is now secured to the wing or fuselage drone 102. The outer seal 210 may be affixed to the surface using a suitable adhesive, a ferromagnetic or electromagnetic strip, a ferromagnetic or electromagnetic material disposed within the outer seal 210, screws, bolts, loop and hook material, etc.

An advantage of securing the outer seal 210 to the wing or fuselage of a drone 102 (or another type of aircraft) is that a variety of different payloads 104 can be secured so long as a portion of the surface of the payload 104 is compatible with the outer seal 210 that is affixed to the drone 102 (or another type of aircraft). An advantage of affixing the outer seal 210 to the payload 104 is that a variety of different payloads 104 may be secured to the drone 102 (or another type of aircraft) at any location on the wing or the fuselage.

An advantage of using ferromagnetic or electromagnetic materials to secure the outer seal 210 is that different outer seals 210 may be selectively used depending upon the characteristics of the payload 104 and/or the drone 102 (or another type of aircraft). Further, if a magnetically secured outer seal 210 is damaged, the damaged outer seal 210 can be easily replaced in the field by a payload installer.

In some embodiments, the outer seal 210 is not secured to either of the surfaces of the drone 102 (or another type of aircraft) and the payload 104. In such embodiments, the payload 104 and the outer seal 210 are placed in position and are secured by the vacuum mounting modules 202. When the payload 104 is released, the outer seal 210 is sacrificed and simply falls to the ground.

In some instances, the outer seal 210 may be initially provided as a sheet of material that the payload installer may cut to a desired shape and size. The embodiment may be particularly advantageous when different types of payloads 104 are being releasably secured to the drone 102 (at the same time, or at different times). Alternatively, or additionally, a pre-cut outer seal 210 may be provided that is cut based on the dimensions of the payload 104.

Figure 5:
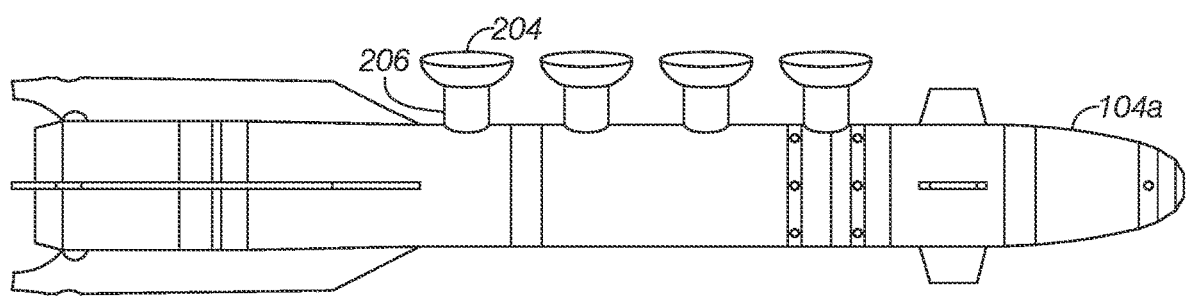
FIG. 5 is a side view of a missile with four vacuum mounting modules, wherein the vacuum control unit is secured to the outer surface of the missile using a suitable releasable connector.

FIG. 5 is a side view of a missile 104a with four vacuum mounting modules 204, wherein the vacuum control unit 206 is secured to the outer surface of the missile 104a using a suitable releasable connector. When the missile 104a is fired by the operator of the drone 102 (or another type of aircraft) by releasing connectors between the surface of the missile 204a and the vacuum mounting module 202, the vacuum mounting modules 202 remain releasably secured to the drone 102. When the drone 102 returns to its home base, the vacuum mounting modules 202 can be released to clear the wings and/or fuselage of the drone 102. Those released vacuum mounting modules 202 can be used at a later time on another missile 104a. After the vacuum mounting modules 202 are released, the payload installer may then install a new similarly fitted missile 104a. The drone 102 may return to the battlefield. Embodiments of the payload attachment system 100 may enable rearming of a drone 102 in a very short time, even rearming the drone 102 in a matter of a few minutes. And, if the drone 102 (or other aircraft) has VTOL capabilities, the drone 102 (or other aircraft) does not need to return to the remotely located home base.

Figure 6:
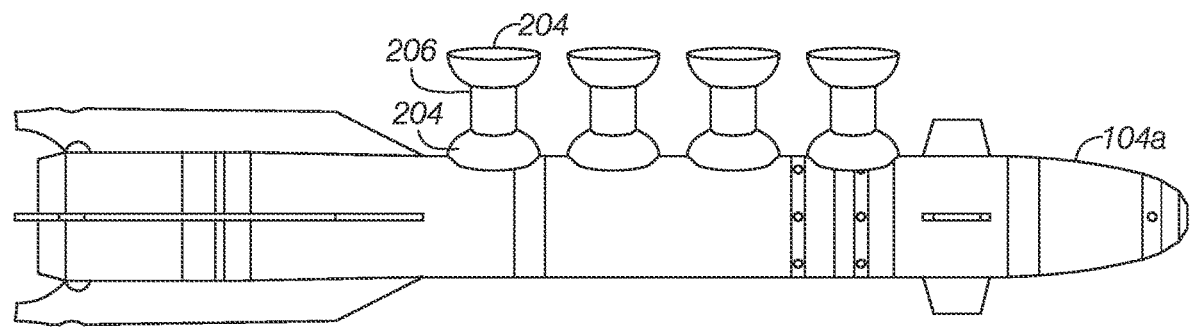
FIG. 6 is a side view of a missile with four vacuum mounting modules, wherein the vacuum mounting modules each have two opposing vacuum cups secured to the outer surface of the missile and to the wing or fuselage of the drone (or another type of aircraft).

FIG. 6 is a side view of a missile 104a with four vacuum mounting modules 204, wherein the vacuum mounting modules 202 each have two opposing vacuum cups 204 secured to the outer surface of the missile 104a and to the wing or fuselage of the drone 102 (or another type of aircraft). Here, during installation, the vacuum cups 204 may be initially secured to the missile 104a. Then, the payload installer holds the missile 104a in place on the wing or fuselage of the drone 102. Once a vacuum is established in the opposing vacuum cups 204, the missile 104a is then releasably secured to the drone 102. The process may first secure the vacuum mounting modules 202 to the missile 104a, and then secure the vacuum mounting modules 202 to the surfaces of the wing or fuselage of the drone 102 (or other aircraft).

When the missile 104a is fired by the operator of the drone 102 (or another type of aircraft), the vacuum mounting modules 202 remain releasably secured to the drone 102. When the drone 102 returns to its home base, the vacuum mounting modules 202 can be released to clear the wings and/or fuselage of the drone 102. Those released vacuum mounting modules 202 can be used at a later time on another missile 104a. After the vacuum mounting modules 202 are released, the payload installer may then install a similarly fitted missile 104a.

Alternatively, the payload installer may simple secure a new payload 104 to the previously installed vacuum mounting modules 202 that are on the surfaces of the wing or fuselage of the drone 102 (or other aircraft). However, completely removing a previously used vacuum mounting module 202 may increase reliability since the removed vacuum mounting module 202 can be inspected for damage before reuse.

After the new payloads 104 are installed, the drone 102 may return to the battle field. Embodiments of the payload attachment system 100 may enable rearming of a drone 102 in a very short time, even rearming the drone 102 in a matter of a few minutes. Further, the payload installers may secure the released vacuum mounting modules 202 to the other missile 104a while the drone 102 is returning to and from the battlefield.

If the drone 102 (or other aircraft) has VTOL capabilities, the drone 102 (or other aircraft) does not need to return to the remotely located home base. Rather, the drone 102 may return to a safe location away from the battlefield, and then be quickly rearmed for return to the battlefield.

Figure 7:
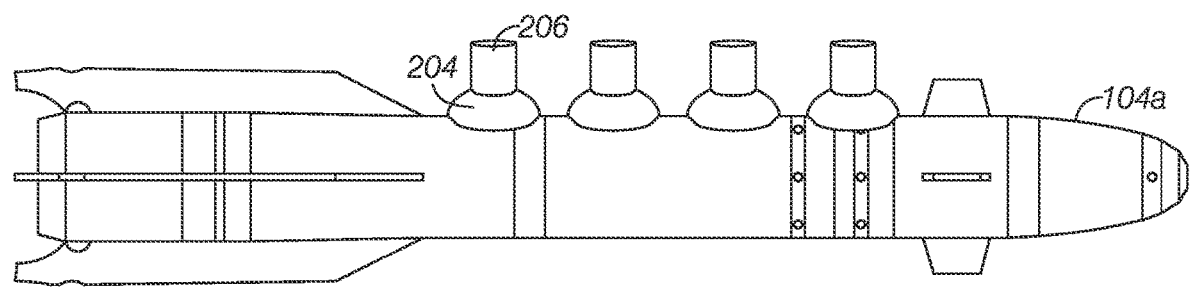
FIG. 7 is a side view of a missile with four vacuum mounting modules, wherein the vacuum control unit is secured to a wing or fuselage of a drone (or another type of aircraft).

FIG. 7 is a side view of a missile 104a with four vacuum mounting modules 202, wherein the vacuum control unit is secured to a wing or fuselage of a drone 102 (or another type of aircraft). Here, during installation, the payload installer holds the missile 104a in place on the vacuum cups 204 that are on the wing or fuselage of the drone 102. Once a vacuum is established in the vacuum cups 204, the missile 104a is then releasably secured to the drone 102. Like the embodiments illustrated in FIGS. 5 and 6, the example embodiment of FIG. 7 enables rearming of a drone 102 in a very short period of time.

In some embodiments, the vacuum cup 204 is releasably secured to a vacuum mounting module 202. Here, if the vacuum cup 204 is damaged during use, the payload installer may easily replace the damaged vacuum cup 204. Alternatively, or additionally, different vacuum cups 204 may be suitable for different types of payloads 104. Here, the payload installer may used the most appropriate vacuum cup 204 for the current payload 104 that is being installed.

Figure 8:
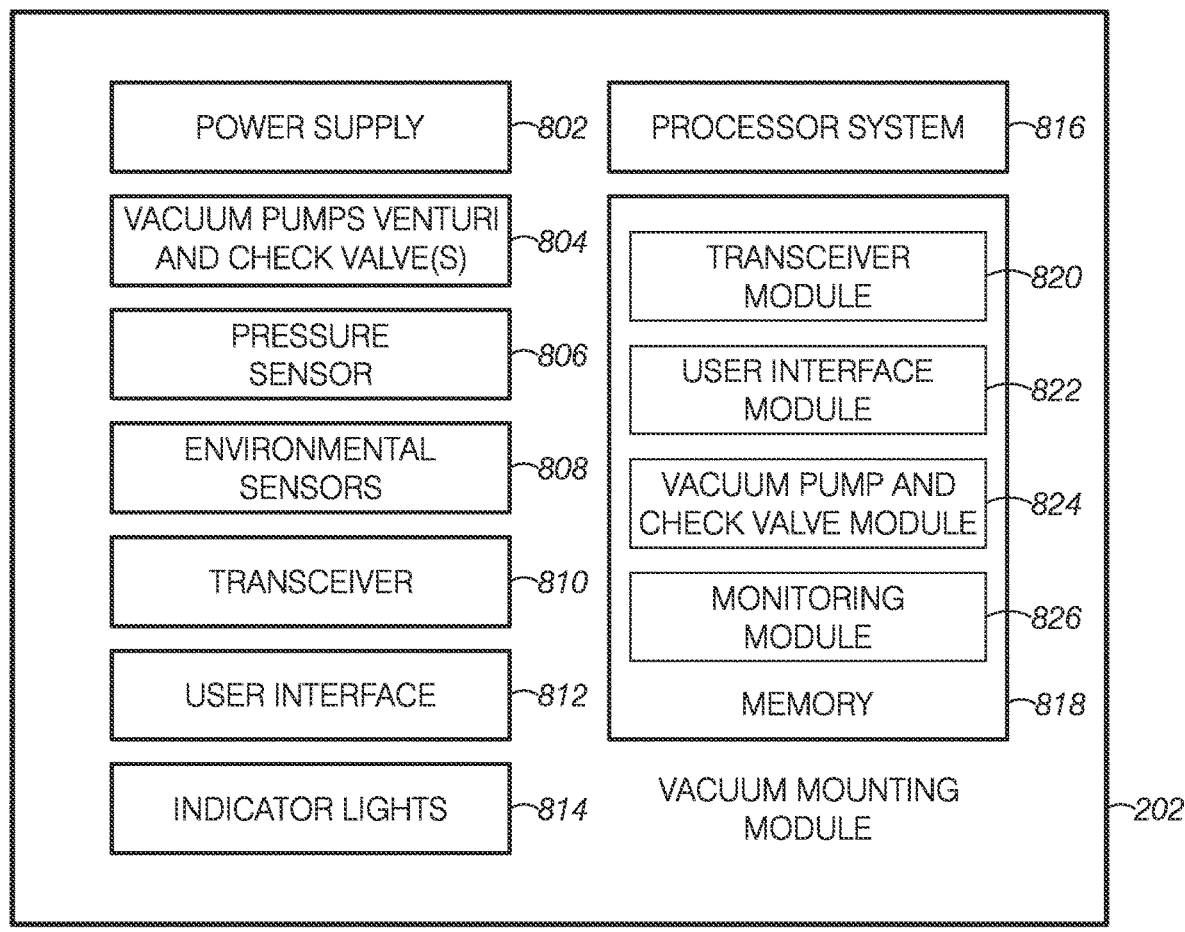
FIG. 8 is a side view diagram of an embodiment of a vacuum mounting module showing selected example electronic components.

FIG. 8 is a side view diagram of an embodiment of a vacuum mounting module 202 showing selected example electronic components. The non-limiting exemplary vacuum mounting module 202 comprises a power supply 802, a vacuum pump 804 (with an optional venturi and a check valve), a pressure sensor 806, one or more optional environmental sensors 808, a transceiver 810, an optional user interface 812, optional indicator lights 814, a processor system 816 (interchangeably referred to herein as a microcontroller), and a memory 818. The memory 818 comprises portions for storing the transceiver module 820, the user interface module 822, the vacuum pump and check valve module 824, and the monitoring module 826. In some embodiments, transceiver module 820, the user interface module 822, the vacuum pump module and check valve 824, and the monitoring module 826 may be integrated together, and/or may be integrated with other logic. In other embodiments, some or all of these memory and other data manipulation functions may be provided by using a remote server or other electronic devices suitably connected via the Internet or otherwise to a client device. Other embodiments of a vacuum mounting module 202 may include some, or may omit some, of the above-described components. Further, additional components not described herein may be included in alternative embodiments.

The power supply 802 is preferably a battery-based power supply that powers the processor system 816, the vacuum pump 804 (and the optional venturi and the check valve), and other selected components. Replaceable batteries and/or rechargeable batteries may be used. Preferably, the power available from the power supply is sufficient to operate the vacuum mounting module 202 for at least a predefined semi-permanent duration, which may be several weeks, several months, or even a year or more. Any suitable power source may be used in alternative embodiments, such as, but not limited to, a generator or other power source in the drone 102, solar power, magnetic power, etc.

In a preferred embodiment, the processor system 816 monitors the power that is currently available from the power supply 802. If the power decreases below a threshold, a warning notification may be communicated from the processor system 816 to the vacuum control device 208 and/or to the drone operator's remote control system. In some embodiments, power management recommendation may be made to the drone operator and/or the payload installer so that they can manage use of the vacuum mounting modules 202. For example, if the power is supplied by batteries and if a low battery condition occurs, or if a low battery condition can be projected to occur in the near future, the drone operator and/or the payload installer may be notified of remaining power or battery life. Then, the drone operator and/or the payload installer may choose to replace one or more of the batteries of the power supply 802, and/or recharge the batteries if the batteries are rechargeable.

The vacuum pump 804, which is controllably coupled to the processor system 816, is an electric vacuum pump that establishes a vacuum (pressure that is less than the actual air pressure) that is sufficient to secure the vacuum cup 204 to a surface of the surfaces of the wing or fuselage of the drone 102 (or other aircraft) and/or the payload 104.

An optional venturi may be used with the vacuum pump 804. The venturi valve may be a mechanical valve that uses a spring or the like to operate the valve, or may be an active venturi valve that uses electricity to operate the valve. The pressure differential across the venturi, if used, enhances the efficiency of the vacuum pump 804.

The processor system 816, executing the vacuum pump and check valve module 824, controls operation of the vacuum pump 804. In response to receiving a vacuum cup actuation signal, the vacuum pump 804 is operated to create the vacuum that releasably secures vacuum mounting module 202 to the surfaces of the wing or fuselage of the drone 102 (or other aircraft) and/or the payload 104. The processor system 816, in response to receiving a vacuum cup release signal, operates the vacuum pump 804 to release the vacuum to release the surfaces of the wing or fuselage of the drone 102 (or other aircraft) and/or the payload 104 from the vacuum mounting module 202. Any suitable vacuum pump 202 now known or later developed is intended to be included within the scope of this disclosure and to be protected by the accompanying claims.

Multiple vacuum pumps 804 provide reliability in the event of a single vacuum pump 804 failure. Any desired number of vacuum pumps 804 may be used in the various embodiments. Also, multiple vacuum pumps 804 can be used to cooperatively create a stronger vacuum. A preferred embodiment has two vacuum pumps 804a, 804b. In a preferred embodiment, the second pump 804b may be a piezoelectric pump or other suitable micro pump. Piezoelectric pumps may be used to maintain vacuum pressure while the drone 102 (or another type of aircraft) is operating in a stealth mode since a piezoelectric pump is very quiet during operation.

Alternatively, or additionally, the vacuum cup 204 may include a small depressurized canister or bottle, or a microchamber, as a source of negative air pressure that can be quickly applied inside of the vacuum cup 204. Alternatively, the depressurized canister or bottle may reside within the payload 104 (see FIG. 5, for example) and/or within the drone 102 or other type of aircraft (see FIG. 7, for example).

An optional pressure sensor 806 monitors pressure within the vacuum cup 204. In an example embodiment, a pressure sensor 806 is located within the vacuum mounting module 202 to sense vacuum pressure. The pressure sensor 806 may be a separate component located within the interior of the vacuum cup 204 or at a vacuum port 408 (FIG. 4) of the vacuum pump(s) 204. Alternatively, or additionally, the pressure sensor 806 may be an integrated component of the vacuum pump 804.

The pressure sensor 806 is communicatively coupled to the processor system 816 (interchangeably referred to herein as a microcontroller). The microcontroller 816, executing the monitoring module 826, monitors the sensed vacuum pressure within the vacuum cup 204 on a real time basis. Once a vacuum has been established to releasably secure the payload to the vacuum cup 204, the processor system 816, executing the vacuum pump module and check valve 824, may further operate the vacuum pump 804 in response to the monitored pressure within the vacuum cup 204 dropping below some predefined threshold. Accordingly, the vacuum pressure within each of the plurality of vacuum cups 204 can be controlled to any desired predetermined pressure value or range.

For example, the vacuum within the plurality of vacuum cups 204 will vary with elevation. In instances where the drone 102 to a relatively higher elevation, or returns down to a lower elevation, the processor system 816 may operate the vacuum pump(s) 204 to adjust and/or maintain the vacuum pressure to the desired target pressure value or range as the elevation changes. For example, the sensor 806 may sense current vacuum pressure. The processor system 816 compares the current vacuum pressure to one of more predefined thresholds. Instructions are communicated to the vacuum pump(s) 804 to increase or decrease the vacuum pressure. Accordingly, a change in vacuum pressure is performed so that the current vacuum pressure remains as some predefined value (or range).

As another example, the vacuum pressure may be varied as a function of drone velocity. Here, a higher vacuum pressure may be generated at higher drone velocities to ensure that the vacuum mounting modules 202 do not become disengaged from the drone 102 and/or the payload 104 due to the increasing wind created by the increased velocity of the drone 102. A velocity sensor (not shown), such as a speedometer, provides current speed information to the processor system 816. The processor system 816 compares the current vacuum pressure to predefined vacuum pressures associated with speed. Instructions are communicated to the vacuum pump(s) 804 to increase or decrease the vacuum pressure to a new vacuum pressure that corresponds to the current velocity. Accordingly, a change in vacuum pressure is performed so that the current vacuum pressure value (or range) is appropriate for the current velocity.

In the various embodiments, a predefined vacuum pressure or pressure range may be maintained within the vacuum cup 204. For example, a slow leak between the edges of the vacuum cup 204 and the surface of the releasably secured payload may result in a loss of vacuum pressure. The sensor 806 may sense current vacuum pressure that is decreasing due to the slow leak. The processor system 816 compares the current vacuum pressure to one of more predefined thresholds. Instructions are communicated to the vacuum pump(s) 204 to increase or decrease the vacuum pressure. Accordingly, a change in vacuum pressure is performed so that the current vacuum pressure remains as some predefined value (or range). Accordingly, the vacuum control unit 206 may automatically operate once the vacuum pressure has fallen outside of the predefined threshold or threshold range to re-establish the vacuum pressure.

As another example, changing environmental conditions, such as temperature and/or altitude, may be changing the vacuum pressure, thereby causing the control unit 206 to automatically operate in response to the vacuum pressure falling or increasing beyond a predefined threshold or threshold range to re-establish the vacuum pressure. Here, the sensor 806 may sense current vacuum pressure that is changing due to changing environmental conditions. The processor system 816 compares the current vacuum pressure to one of more predefined thresholds. Instructions are communicated to the vacuum pump(s) 804 to increase or decrease the vacuum pressure. Accordingly, a change in vacuum pressure is performed so that the current vacuum pressure remains as some predefined value (or range).

The environmental sensors 808 may be used to monitor external environmental conditions, such as humidity, rain, wind speed, ambient air pressure, temperature or the like. Based on sensed environmental conditions, the processor system 816, executing the vacuum pump module and check valve 824, may modify the predefined minimum vacuum pressure so that the vacuum pressure maintained within the vacuum cup 204 is suitable for changing environmental conditions. For example, if altitude increases such that the ambient air pressure decreases, or the altitude decreases such that ambient air pressure increases, then actual vacuum pressure may be automatically adjusted by the vacuum control unit 206 and/or the vacuum control device 208 to maintain a predefined minimum and/or maximum vacuum pressure within the vacuum cup 204 or the vacuum mounting modules 202. Alternatively, some embodiment may maintain a predefined pressure difference between the vacuum within the vacuum cup 204 and the current ambient air pressure.

The transceiver 810 is configured to wirelessly receive and/or transmit wireless radio frequency (RF) communication signals to other transceivers 810 residing in other vacuum mounting modules 202 and/or the drone 102. In such embodiments, the wireless communication transceiver 810 may be a low power communication system, such as a near-field communication system. An example near-field communication is Bluetooth. Any suitable low power and/or near-field communication system now known or later developed may be used in the various embodiments. A low power near-field communication system is suitable because of the close proximity of the vacuum mounting modules 202 and/or the drone transceiver to each other.

Alternatively, or additionally, other wireless based communication networks and/or hybrid communication networks may be communicatively coupled to the transceiver 810. Example communication system include, but are not limited to, a cellular phone system, a Wi-Fi system, a satellite system, a radio frequency (RF) system, and/or a telephony system. In such embodiments, the transceiver 810 may be communicatively coupled to the wireless communication system. Accordingly, the transceiver 810 enables communication between a remote electronic device, such as the drone operator's remote control system, and the vacuum mounting modules 202. In some applications, the transceiver 810 is communicatively coupled to the operator's portable hand held electronic device, such as a smart phone, notebook, or the like. In such embodiments, the operator, while in the battlefield, may use their portable hand held electronic device and/or another control system to operate (initiate a vacuum cup release signal) and/or monitor performance of the vacuum mounting modules 202.

In an example embodiment, the processor system 816, executing the transceiver module 820, receives communications from and/or transmits communications to other vacuum mounting modules 202, the drone transceiver, or another remote electronic device. As disclosed herein, the vacuum mounting module 202 operates the vacuum pump 804 to establish a vacuum within the vacuum cup 204 in response to the transceiver 810 receiving the vacuum cup actuation signal from the one of the other vacuum mounting modules 202, the drone transceiver, and/or another remote electronic device. Conversely, the processor system 816, executing the transceiver module 820, may deactivate the vacuum pump 804 to end the vacuum within the vacuum cup 204 in response to the transceiver 810 receiving a vacuum cup release signal from the from one of the other vacuum mounting modules 202, the drone transceiver, and/or from another remote electronic device such as the operator's drone remote control system.

An optional user interface 812 may be provided to enable manual control of a vacuum mounting module 202 by a payload installer. A button, switch or other controller may enable the payload installer to manually actuate the vacuum control unit 206. The processor system 816, executing the user interface module 822, may operate the vacuum pump 804 to establish a vacuum within the vacuum cup 204 and/or to release the vacuum based on control signals generated by the user interface 812 in response to the payload installer's manual manipulation of the user interface 812.

For example, the payload installer may wish to relocate and/or reorient the secured payload 104 after the payload 104 has been initially secured to the drone 102 (or another type of aircraft). For instance, location and/or orientation of a missile 104*a* that has been secured to a surface the wing or fuselage of the drone 102 may be changed to adjust the orientation of the missile 104*a*. The payload installer may manually deactivate one or more of the vacuum mounting modules 202 to implement the adjustment, and then reactivate those vacuum mounting modules 202 to reestablish the vacuum within the vacuum cups 204.

One or more optional indicator lights 814 may be provided on the exterior of the vacuum mounting module 202 and/or the vacuum control device 208 to indicate operational status of the device and/or system. For example, the processor system 816 may cause the indicator light 814 to emit light when the vacuum mounting module 202 is functioning properly. Alternatively, or additionally, another colored light and/or another indicator light may emit light when the vacuum mounting module 202 is not properly working. Accordingly, the payload installer may visually discern whether a vacuum mounting module 202 is properly operating based on the visible output of an indicator light 814. Is some embodiments, the indicator light 814 may be remotely located. Here, the indicator light 814 would be communicatively coupled to another remote transceiver. A light control signal, generated by the processor system 816, would be communicated from the transceiver 810 to the other transceiver. The light control signal would then be received by the remote indicator light 814.

Figure 9:
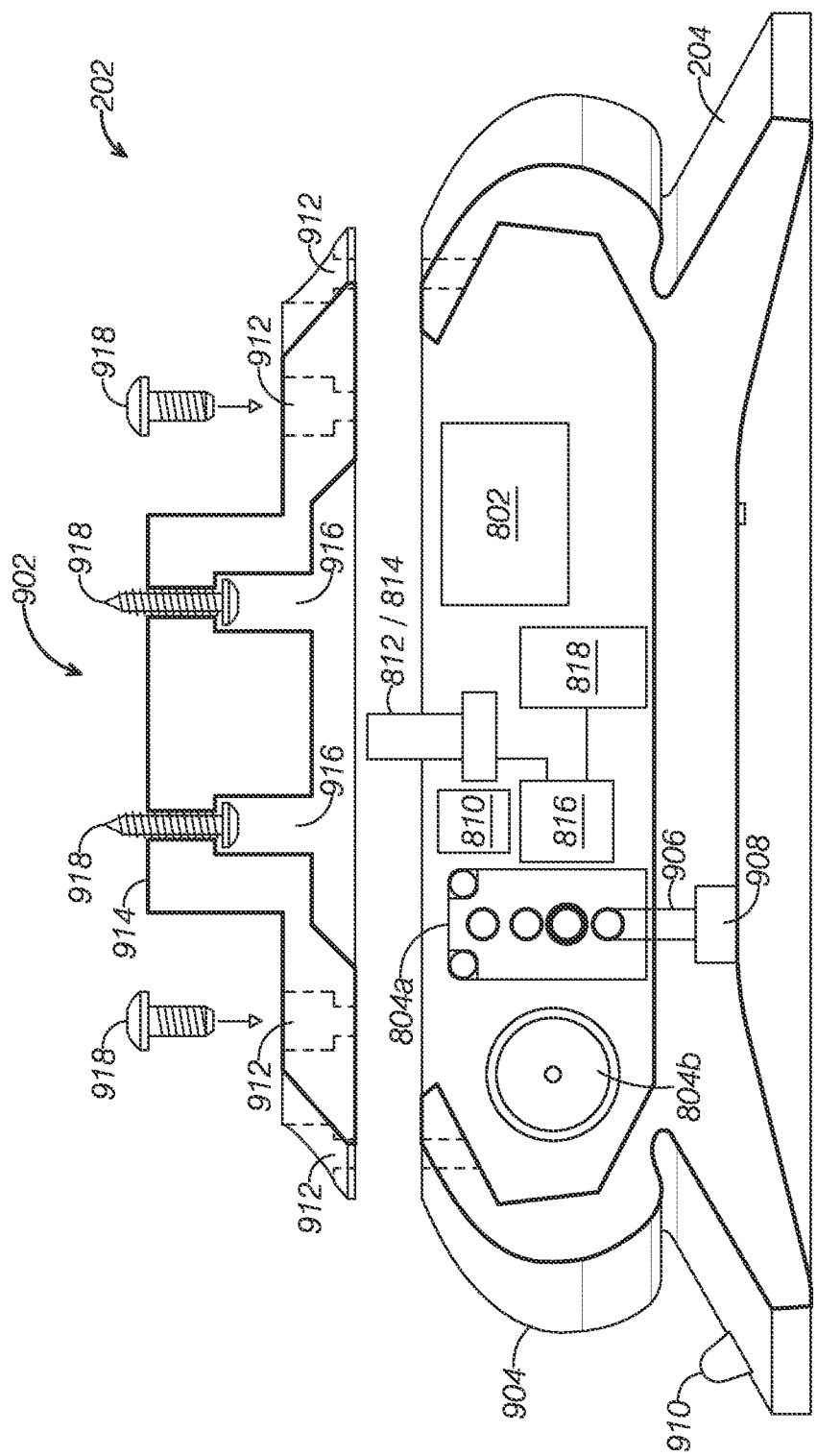
FIG. 9 is a side cut away view of the vacuum mounting module with a non-limiting example cover member.

FIG. 9 is a side cut away view of the vacuum mounting module 202 with a non-limiting example cover member 902. The vacuum control unit 206 is preferably defined by a rigid or semi-rigid body member 904 (such as, but not limited to, a monocoque body) that defines a cavity that encases the various components within the vacuum control unit 206. Some embodiments may be formed as a monocoque body. The body member 904 protects the various components within the body cavity from damage. In a non-limiting example embodiment, the monocoque body member 904 defines a monocoque cavity that secures and protects the components of the vacuum control unit 206, and wherein the vacuum cup 204 is coupled to the monocoque body member 904.

The vacuum cup 204 is preferably made of a flexible or semiflexible material that is air impermeable. In the various embodiments, the vacuum cup 204 is permanently secured to the body member 904 in an air tight fashion. In some embodiments, the body member 904 and the vacuum cup 204 are formed as a unibody piece.

A port 906 fluidly couples the vacuum pumps 204*a*, 204*b* with the interior cavity of the vacuum cup 204. A check valve 908 may be used to maintain an established vacuum pressure within the interior of the vacuum cup 204. The check valve 908 has a cracking pressure corresponding to the predefined vacuum pressure in the vacuum chamber such that the predefined vacuum pressure is maintained within the vacuum cup 204 when the vacuum cup mounting system 100 is secured to the surface of the object of interest. The check valve 908 may be a mechanical check valve that uses a spring or the like to operate the valve, or may be an active check valve that uses electricity to operate the valve 908.

The example embodiment illustrated in FIG. 9 includes one or more optional manual disengagement tabs 910. The manual disengagement tab 910 is an outward protruding member on the outer side of the vacuum cup 204. The tab 910 can be grasped by the user to lift a bottom portion of the flexible vacuum cup 204 away from the surface of the payload after the vacuum has been released. When the user grasps and pulls on the manual disengagement tab 910, ambient air inrushes into the interior of the vacuum cup 204 so that any remaining vacuum pressure is released, thereby releasing the vacuum mounting module 202 from the payload. Any desired number of manual disengagement tabs 910 may be provided at any location of interest in the various embodiments.

A plurality of apertures 912 (holes) are illustrated as being fabricated into the body member 904 of the vacuum control unit 206. These apertures 912 are used to secure the cover member 902 to the upper surface of the body member 904. The apertures 912 may be threaded holes that matingly receive threaded bolts or screws 918 (FIG. 4) passing through corresponding apertures 912 in the cover member 902. When the bolts or screws 918 are screwed into place and then tightened, the cover member 902 becomes secured to the top of the body member 904. Alternatively, the apertures 912 may not be threaded such that a nut and bolt 918 may be used to secure the cover member 902 to the body member 904 of the vacuum control unit 206. Alternatively, or additionally, other fastening means such as threads, clamps, magnets, adhesive, or the like may be used to secure the cover member 902 to the top of the vacuum cup 204. In some embodiments, the cover member 902 may be secured to, or made part of, the body member 904 of the vacuum control unit 206 during fabrication.

The non-limiting example cover member 902 may include an optional outwardly protruding member 914 that protrudes outwardly from an outer surface of the cover member 902. Optional apertures 916 may be disposed through the outwardly protruding member 912. Bolts or screws 918 are used to secure the cover member 902 to the secured-to object. The height of the outwardly protruding member 914, is this non-limiting example embodiment, is sufficiently high to permit access to the apertures 912 when the bolts or screws 918 are used to secure the cover member 902 to the top of the vacuum control unit 206.

Alternatively, the exterior edges of the cover member 902 may be threaded. The interior surface near the top of the body member 904 may have mating threads. Once the cover member 902 is secured to the surfaces of the wing or fuselage of the drone 102 (or other aircraft) and/or the payload 104, the body member 904 may be screwed onto the secured cover member 902.

Alternatively, tabs or other protrusions (not shown) may extend outwardly from the body member 904 and/or the cover member 902. Screws 918, bolts 918 or the like can then be used to secure the vacuum mounting module 202 to the surfaces of the wing or fuselage of the drone 102 (or other aircraft) and/or the payload 104. Clips, snaps, rails, or the like may be used to secure the vacuum mounting module 202 to the surfaces of the wing or fuselage of the drone 102 (or other aircraft) and/or the payload 104.

After contemplating the disclosure, one skilled in the art appreciates that various types of securing means may be used to secure the cover member 902 to the top of the vacuum control unit 206 without departing from the novel features of the present invention. Similarly, one skilled in the art appreciates that various types of securing means may be used to secure the cover member 902 to any type of secured-to object without departing from the novel features of the present invention. All such embodiments are intended to be within the scope of this disclosure and to be protected by the accompanying claims.

Figure 10:
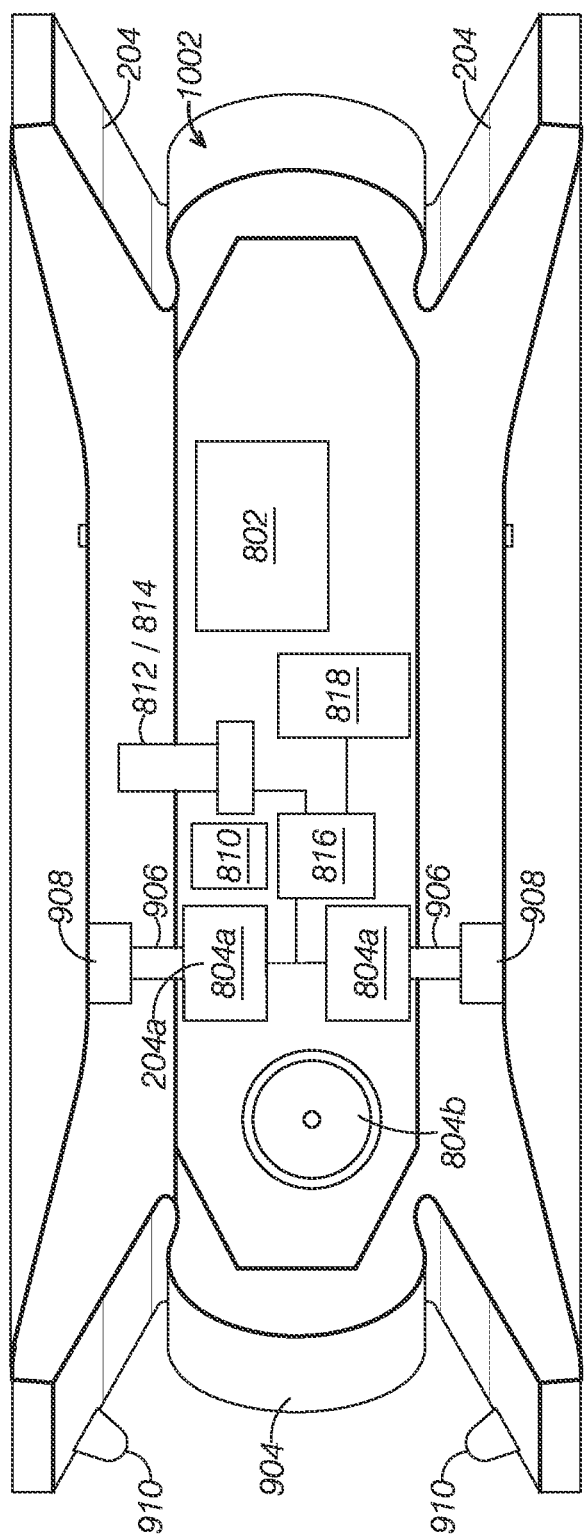
FIG. 10 is a side cut away view of the vacuum mounting module with two opposing vacuum cups.

FIG. 10 is a side cut away view of the vacuum mounting module 1002 with two opposing vacuum cups 204. The components and operational features of the vacuum mounting module 1002 may the similar to, or the same as, the component and operational features of the vacuum mounting module 202. For brevity, like components and/or operational features are not again described herein for brevity. A practical application of this vacuum mounting module 1004 I illustrated in FIG. 6.

The example embodiment illustrated in FIG. 10 shows two vacuum pumps 804a that establish and maintain a vacuum in their respective vacuum cups 204. Alternative embodiments may employ any suitable number and/or type of vacuum pumps 804.

Figure 11:
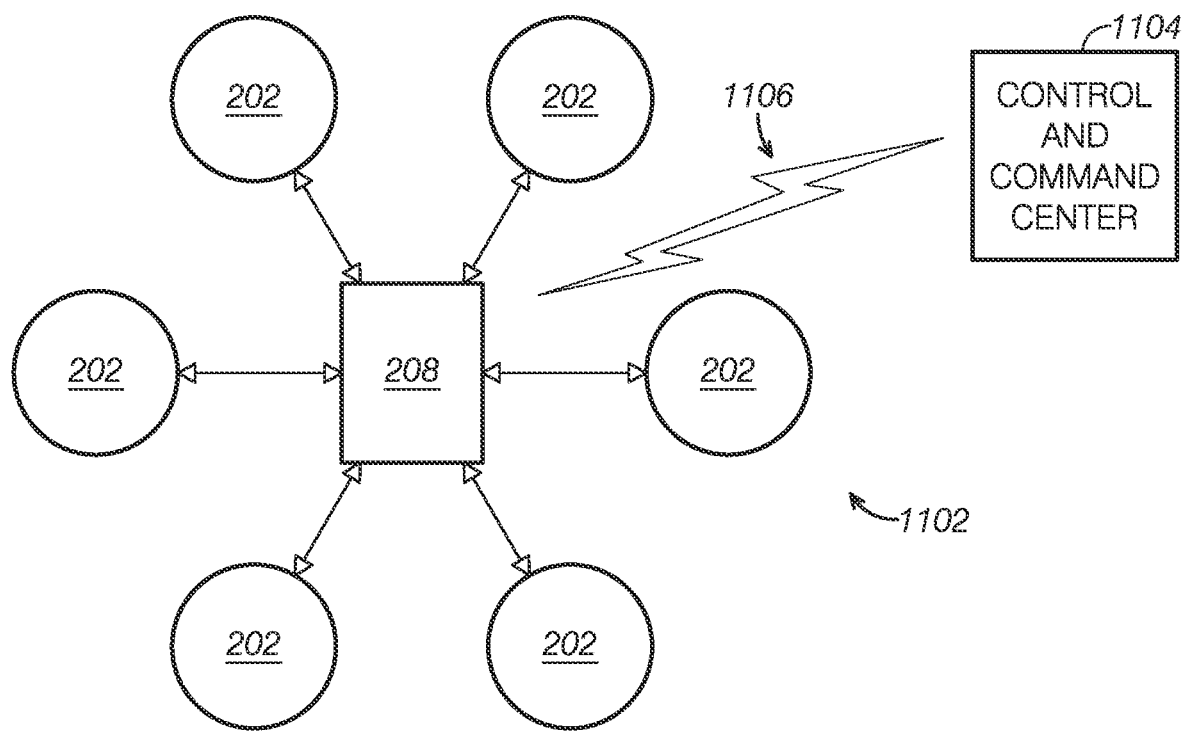
FIG. 11 is a block diagram of a vacuum mounting module control system employing a designated vacuum control device that controls a plurality of vacuum mounting modules.

FIG. 11 is a block diagram of a vacuum mounting module control system 1102 employing a designated vacuum control device 208 that controls a plurality of vacuum mounting modules 202. Each of the vacuum mounting modules 202 (slave device) are controllably coupled to the vacuum control device 208 (master device). Preferably, a master/slave control system enables the vacuum control device 208 to generate and transmit vacuum cup actuation signals and vacuum cup release signals to the plurality of vacuum mounting modules 202 using a suitable near field or wire based communication signal. In some embodiments, a selected one of the vacuum mounting modules 202 is designated as the vacuum control device 208.

Also, the vacuum control device 208 is configured to receive information from the plurality of vacuum mounting modules 202. Operational status information may be communicated to the vacuum control device 208. For example, if one of the vacuum mounting modules 202 fails or begins to loos vacuum pressure, the vacuum control unit 206 can be notified of the failure and/or loss of vacuum pressure by that particular vacuum mounting module 202. Optionally, the vacuum control device 208 may increase vacuum pressure within the remaining vacuum mounting modules 202 to compensate for the failing vacuum mounting module 202. As another non-limiting example, vacuum pressure in one or more of the vacuum mounting modules 202 may be selectively modified by the vacuum control device 208.

Optionally, the vacuum control device 208 may be communicatively coupled to a remote control and command center 1104. The control and command center 1104 may communicate with the vacuum control device 208 using a suitable wireless communication signal 1106 format, such as a satellite signal, a cellular communication signal, or the like. The vacuum control device 208 can generate and transmit the vacuum cup actuation signals and the vacuum cup release signals in response to receiving instructions from the control and command center 1104 that is being controlled by the drone operator. Additionally, or alternatively, the vacuum control device 208 may communicate operational status information and/or vacuum pressure information to the control and command center 1104. Accordingly, the drone operator may appreciate the operating condition of the payload attachment system 100. If the control and command center 1104 is a smart phone or the like, an app may be installed on the smart phone that facilitates communications between the smart phone and the vacuum control device 208.

Figure 12:
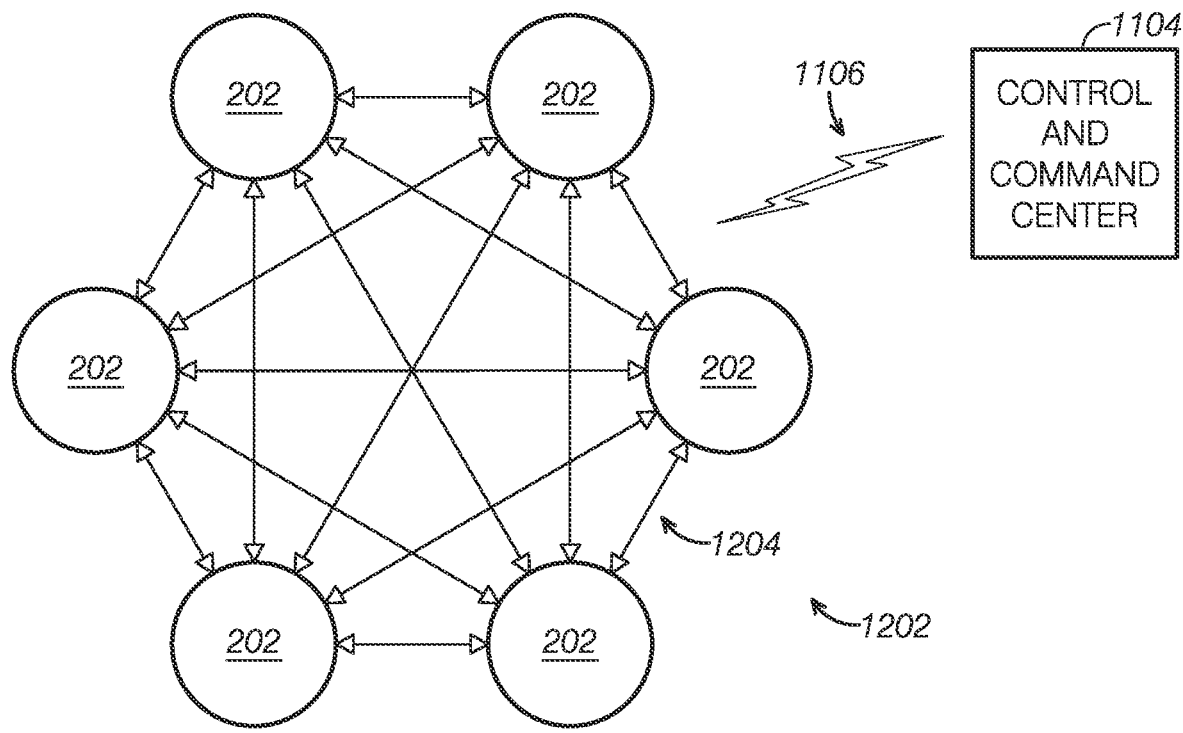
FIG. 12 is a block diagram of a vacuum mounting module control system employing mesh network wherein a plurality of vacuum mounting modules cooperatively control operation of the payload attachment system.

FIG. 12 is a block diagram of a vacuum mounting module control system 1202 employing mesh network 704 wherein a plurality of vacuum mounting modules 202 cooperatively control operation of the payload attachment system 100. Here, individual vacuum mounting modules 202 are communicatively coupled together. Each of the vacuum mounting modules 202 communicate information to each of the other vacuum mounting modules 202, such as operational status and/or vacuum pressure. Accordingly, the vacuum mounting modules 202 cooperatively work together to secure an object of interest. Some embodiments may employ an artificial intelligence algorithm to more effectively control operation of the payload attachment system 100.

Optionally, one or more of the vacuum mounting modules 202 may be communicatively coupled to a control and command center 1104 using a suitable wireless communication signal 1106 format, such as a satellite signal, a cellular communication signal, or the like. When one or more of the vacuum mounting modules 202 receives an instruction from the remote control and command center 1104, the receiving vacuum mounting module 202 communicates the vacuum cup actuation signal or the vacuum cup release signal to the other vacuum mounting modules 202. In some embodiments, a wire-based communication format may be used.

Additionally, or alternatively, the one or more of the vacuum mounting modules 202 may communicate operational status information and/or vacuum pressure information to the control and command center 1104. Accordingly, the drone operator may appreciate the operating condition of the payload attachment system 100. If the remote control and command center 1104 is a smart phone or the like, an app may be installed on the smart phone controlled by the drone operator that facilitates communications between the smart phone and the vacuum control device 208.

After contemplation of this disclosure, one skilled in the art appreciates that the vacuum mounting modules 202 may be implemented using any suitable Internet of Things (IOT) technology. All such IOT embodiments, now known or later developed, are intended to be within the scope of this disclosure and to be protected by the accompanying claims.

It should be emphasized that the above-described embodiments of the payload attachment system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A payload attachment system that employs at least one vacuum mounting module, the vacuum mounting module comprising:
    a cover member with an outer surface that is securable to a surface of a wing or a fuselage of a drone;
    a body member defined by a cavity that is covered by the cover member during use of the vacuum object mounting system;
    a vacuum cup coupled to the body member,
        wherein the vacuum cup is disposed on an exterior of the body member on a side of the body member opposing the cover member:
    a microcontroller residing within the cavity of the body member;
    a vacuum pump residing within the cavity of the body member,
        wherein the vacuum pump is controllably coupled to the microcontroller, and
        wherein the vacuum pump is fluidly coupled to the vacuum cup; and
    a power source controllably coupled to the microcontroller and connected to the vacuum pump,
        wherein the power source powers the vacuum pump in response to an actuation signal received at the microcontroller to cause the vacuum pump to create a predefined vacuum pressure between a surface of a payload and the vacuum cup,
    wherein the vacuum mounting module further comprises:
        a vacuum chamber in fluid communication with the vacuum pump and the vacuum cup; and
        a check valve disposed between the vacuum chamber and the vacuum cup,
        wherein the microcontroller actuates the vacuum pump to maintain the predefined vacuum pressure in the vacuum chamber, and
        wherein the check valve has a cracking pressure corresponding to the predefined vacuum pressure such that the predefined vacuum pressure is maintained within the vacuum cup when the vacuum cup mounting system is secured to the surface of the payload.

2. A payload attachment system that employs at least one vacuum mounting module, the vacuum mounting module comprising:
    a cover member with an outer surface that is securable to a surface of a wing or a fuselage of a drone;
    a body member defined by a cavity that is covered by the cover member during use of the vacuum object mounting system;
    a vacuum cup coupled to the body member,
        wherein the vacuum cup is disposed on an exterior of the body member on a side of the body member opposing the cover member:
    a microcontroller residing within the cavity of the body member;
    a vacuum pump residing within the cavity of the body member,
        wherein the vacuum pump is controllably coupled to the microcontroller, and
        wherein the vacuum pump is fluidly coupled to the vacuum cup; and
    a power source controllably coupled to the microcontroller and connected to the vacuum pump,
        wherein the power source powers the vacuum pump in response to an actuation signal received at the microcontroller to cause the vacuum pump to create a predefined vacuum pressure between a surface of a payload and the vacuum cup,
    wherein the vacuum mounting module further comprises:
        a manual actuator disposed on an outer surface of the vacuum cup mounting system and communicatively coupled to the microcontroller,
        wherein a payload installer actuates the manual actuator to release the vacuum cup mounting system from the surface of the payload,
        wherein the manual actuator communicates a release signal to the microcontroller in response to actuation by the payload installer, and
        wherein the microcontroller actuates the vacuum pump to release the vacuum cup mounting system from the surface of the payload in response to receiving the release signal, wherein a payload installer further actuates the manual actuator to secure the vacuum cup mounting system to the surface of the payload, wherein the manual actuator communicates the actuation signal to the microcontroller in response to further actuation by the payload installer, and wherein the microcontroller actuates the vacuum pump to secure the vacuum cup mounting system to the surface of the payload in response to receiving the actuation signal.

3. A payload attachment system that employs at least one vacuum mounting module, the vacuum mounting module comprising:

a cover member with an outer surface that is securable to a surface of a wing or a fuselage of a drone;

a body member defined by a cavity that is covered by the cover member during use of the vacuum object mounting system;

a vacuum cup coupled to the body member,
wherein the vacuum cup is disposed on an exterior of the body member on a side of the body member opposing the cover member;

a microcontroller residing within the cavity of the body member;

a vacuum pump residing within the cavity of the body member,
wherein the vacuum pump is controllably coupled to the microcontroller, and
wherein the vacuum pump is fluidly coupled to the vacuum cup; and a power source controllably coupled to the microcontroller and connected to the vacuum pump,
wherein the power source powers the vacuum pump in response to an actuation signal received at the microcontroller to cause the vacuum pump to create a predefined vacuum pressure between a surface of a payload and the vacuum cup, wherein the vacuum mounting module further comprises:
an indicator light disposed on an outer surface of the vacuum cup mounting system and communicatively coupled to the microcontroller,
wherein the microcontroller actuates the indicator light in response to securing the vacuum cup mounting system to the surface of the payload,
wherein the indicator light illuminates in response to securing the vacuum cup unit to the surface of the payload, and
wherein a payload installer may view the indicator light to intuitively understand whether the vacuum cup mounting system is secured to the surface of the payload.

4. A payload attachment system that employs at least one vacuum mounting module, the vacuum mounting module comprising:

a cover member with an outer surface that is securable to a surface of a wing or a fuselage of a drone;

a body member defined by a cavity that is covered by the cover member during use of the vacuum object mounting system;

a vacuum cup coupled to the body member,
wherein the vacuum cup is disposed on an exterior of the body member on a side of the body member opposing the cover member:

a microcontroller residing within the cavity of the body member;

a vacuum pump residing within the cavity of the body member,
wherein the vacuum pump is controllably coupled to the microcontroller, and
wherein the vacuum pump is fluidly coupled to the vacuum cup; and a power source controllably coupled to the microcontroller and connected to the vacuum pump,
wherein the power source powers the vacuum pump in response to an actuation signal received at the microcontroller to cause the vacuum pump to create a predefined vacuum pressure between a surface of a payload and the vacuum cup, wherein the vacuum cup mounting system is one of a plurality of vacuum cup mounting systems, and wherein each one of the plurality of vacuum cup mounting systems further comprise:
a transceiver communicatively coupled to the respective microcontroller,
wherein each one of the microcontrollers of the plurality vacuum cup mounting systems are in communication with a vacuum control device, and
wherein each of the vacuum pumps of the plurality of vacuum cup mounting systems operate to create the vacuum between the surface of the payload and the vacuum cup in response to their respective microcontroller receiving the actuation signal from the vacuum control device via the respective transceiver.

5. A payload attachment system that employs at least one vacuum mounting module, the vacuum mounting module comprising:

a cover member with an outer surface that is securable to a surface of a wing or a fuselage of a drone;

a body member defined by a cavity that is covered by the cover member during use of the vacuum object mounting system;

a vacuum cup coupled to the body member,
wherein the vacuum cup is disposed on an exterior of the body member on a side of the body member opposing the cover member:

a microcontroller residing within the cavity of the body member;

a vacuum pump residing within the cavity of the body member,
wherein the vacuum pump is controllably coupled to the microcontroller, and
wherein the vacuum pump is fluidly coupled to the vacuum cup:

a power source controllably coupled to the microcontroller and connected to the vacuum pump; and an outer seal, wherein the outer seal corresponds to a shape and size of a selected portion of the payload, wherein a plurality of vacuum mounting modules are configured to cooperatively secure payload to the drone, and wherein the power source powers the vacuum pump in response to an actuation signal received at the microcontroller to cause the vacuum pump to create a predefined vacuum pressure between a surface of a payload and the vacuum cup.

6. The payload attachment system of claim 5, wherein the outer seal further comprises:

one of a ferromagnetic strip or an electromagnetic strip,
wherein the ferromagnetic strip or the electromagnetic strip are configured to hold the outer seal in a selected location on one of the drone or the payload while a payload installer is securing the payload to the drone.

7. A payload attachment system that employs at least one vacuum mounting module, the vacuum mounting module comprising:
- a cover member with an outer surface that is securable to a surface of a wing or a fuselage of a drone;
- a body member defined by a cavity that is covered by the cover member during use of the vacuum object mounting system;
- a vacuum cup coupled to the body member,
  - wherein the vacuum cup is disposed on an exterior of the body member on a side of the body member opposing the cover member:
- a microcontroller residing within the cavity of the body member;
- a vacuum pump residing within the cavity of the body member,
  - wherein the vacuum pump is controllably coupled to the microcontroller, and
  - wherein the vacuum pump is fluidly coupled to the vacuum cup; and
- a power source controllably coupled to the microcontroller and connected to the vacuum pump,
- wherein the power source powers the vacuum pump in response to an actuation signal received at the microcontroller to cause the vacuum pump to create a predefined vacuum pressure between a surface of a payload and the vacuum cup,
- wherein the vacuum mounting module further comprises:
  - at least one environmental sensor communicatively coupled to the transceiver and that senses an environmental condition,
  - wherein the at least one environmental sensor communicates environmental information corresponding to the sensed environmental condition to the transceiver,
  - wherein the received environmental information is communicated from the transceiver to the vacuum control device, and
  - wherein the vacuum control device determines an adjustment to the predefined vacuum pressure based on the received environmental information.

8. A payload attachment system that employs at least one vacuum mounting module, the vacuum mounting module comprising:
- a cover member with an outer surface that is securable to a surface of a wing or a fuselage of a drone;
- a body member defined by a cavity that is covered by the cover member during use of the vacuum object mounting system;
- a vacuum cup coupled to the body member,
  - wherein the vacuum cup is disposed on an exterior of the body member on a side of the body member opposing the cover member:
- a microcontroller residing within the cavity of the body member;
- a vacuum pump residing within the cavity of the body member,
  - wherein the vacuum pump is controllably coupled to the microcontroller, and
  - wherein the vacuum pump is fluidly coupled to the vacuum cup; and
- a power source controllably coupled to the microcontroller and connected to the vacuum pump,
- wherein the power source powers the vacuum pump in response to an actuation signal received at the microcontroller to cause the vacuum pump to create a predefined vacuum pressure between a surface of a payload and the vacuum cup,
- wherein a plurality of vacuum mounting modules further comprises:
  - a transceiver,
  - wherein the corresponding microcontroller communicates adjustment information corresponding to the adjustment to the predefined vacuum pressure to the corresponding transceiver,
  - wherein the corresponding transceiver broadcasts the adjustment information,
  - wherein the transceivers in the other plurality of vacuum cup units receive the broadcasted adjustment information, and
  - wherein the corresponding microcontrollers effect the adjustment to their predefined vacuum pressure based on the received adjustment information.

9. A payload attachment system that employs at least one vacuum mounting module, the vacuum mounting module comprising:
- a cover member with an outer surface that is securable to a payload;
- a body member defined by a cavity that is covered by the cover member during use of the vacuum object mounting system;
- a vacuum cup coupled to the body member,
  - wherein the vacuum cup is disposed on an exterior of the body member on a side of the body member opposing the cover member:
- a microcontroller residing within the cavity of the body member;
- a vacuum pump residing within the cavity of the body member,
  - wherein the vacuum pump is controllably coupled to the microcontroller, and
  - wherein the vacuum pump is fluidly coupled to the vacuum cup; and
- a power source controllably coupled to the microcontroller and connected to the vacuum pump,
- wherein the power source powers the vacuum pump in response to an actuation signal received at the microcontroller to cause the vacuum pump to create a predefined vacuum pressure between a surface of a wing or a fuselage of a drone and the vacuum cup,
- wherein the cover member comprises:
  - an attachment means configured to attach the outer surface of the cover member to the drone.

10. A payload attachment system that employs at least one vacuum mounting module, the vacuum mounting module comprising:
- a cover member with an outer surface that is securable to a payload;
- a body member defined by a cavity that is covered by the cover member during use of the vacuum object mounting system;
- a vacuum cup coupled to the body member,
  - wherein the vacuum cup is disposed on an exterior of the body member on a side of the body member opposing the cover member:
- a microcontroller residing within the cavity of the body member;
- a vacuum pump residing within the cavity of the body member,
  - wherein the vacuum pump is controllably coupled to the microcontroller, and
  - wherein the vacuum pump is fluidly coupled to the vacuum cup; and
- a power source controllably coupled to the microcontroller and connected to the vacuum pump, wherein the power source powers the vacuum pump in response to an actuation signal received at the microcontroller to cause the vacuum pump to create a predefined vacuum pressure between a surface of a wing or a fuselage of a drone and the vacuum cup, and wherein the attachment means is configured to releasably attach the outer surface of the cover member to the drone.

11. A payload attachment system that employs at least one vacuum mounting module, the vacuum mounting module comprising:

a cover member with an outer surface that is securable to a payload;

a body member defined by a cavity that is covered by the cover member during use of the vacuum object mounting system;

a vacuum cup coupled to the body member,
wherein the vacuum cup is disposed on an exterior of the body member on a side of the body member opposing the cover member:

a microcontroller residing within the cavity of the body member;

a vacuum pump residing within the cavity of the body member,
wherein the vacuum pump is controllably coupled to the microcontroller, and
wherein the vacuum pump is fluidly coupled to the vacuum cup:

a power source controllably coupled to the microcontroller and connected to the vacuum pump; and an outer seal, wherein the outer seal corresponds to a shape and size of a selected portion of the payload, wherein the power source powers the vacuum pump in response to an actuation signal received at the microcontroller to cause the vacuum pump to create a predefined vacuum pressure between a surface of a wing or a fuselage of a drone and the vacuum cup, wherein a plurality of vacuum mounting modules are configured to cooperatively secure payload to the drone.

12. The payload attachment system of claim 11, wherein the outer seal further comprises:

one of a ferromagnetic strip or an electromagnetic strip,
wherein the ferromagnetic strip or an electromagnetic strip are configured to hold the outer seal in a selected location on one of the drone or the payload while a payload installer is securing the payload to the drone.

13. A payload attachment system that employs at least one vacuum mounting module, the vacuum mounting module comprising:

a cover member with an outer surface that is securable to a payload;

a body member defined by a cavity that is covered by the cover member during use of the vacuum object mounting system;

a first vacuum cup coupled to the body member,
wherein the vacuum cup is disposed on an exterior of the body member;

a second vacuum cup coupled to the body member,
wherein the vacuum cup is disposed on an exterior of the body member on a side of the body member opposing the first vacuum cup;

a microcontroller residing within the cavity of the body member;

a first vacuum pump residing within the cavity of the body member,
wherein the first vacuum pump is controllably coupled to the microcontroller, and
wherein the first vacuum pump is fluidly coupled to the first vacuum cup;

a second vacuum pump residing within the cavity of the body member,
wherein the second vacuum pump is controllably coupled to the microcontroller, and
wherein the second vacuum pump is fluidly coupled to the second vacuum cup; and a power source controllably coupled to the microcontroller and connected to the first vacuum pump and the second vacuum pump, wherein the power source powers the first vacuum pump in response to a first actuation signal received at the microcontroller to cause the first vacuum pump to create a predefined vacuum pressure between a surface of a wing or a fuselage of a drone and the first vacuum cup, and wherein the power source powers the second vacuum pump in response to a second actuation signal received at the microcontroller to cause the second vacuum pump to create a predefined vacuum pressure between a surface of the payload and the second vacuum cup.

* * * * *